(12) United States Patent
Felix

(10) Patent No.: US 9,639,327 B2
(45) Date of Patent: May 2, 2017

(54) LOGARITHMIC GAIN ADJUSTER

(75) Inventor: Stephen Felix, Bristol (GB)

(73) Assignee: Nvidia Corporation, Santa Clara, CA (US)

( * ) Notice: Subject to any disclaimer, the term of this patent is extended or adjusted under 35 U.S.C. 154(b) by 916 days.

(21) Appl. No.: 13/638,763

(22) PCT Filed: Apr. 7, 2011

(86) PCT No.: PCT/EP2011/055440
§ 371 (c)(1),
(2), (4) Date: Nov. 8, 2013

(87) PCT Pub. No.: WO2011/124649
PCT Pub. Date: Oct. 13, 2011

(65) Prior Publication Data
US 2014/0143290 A1     May 22, 2014

(30) Foreign Application Priority Data

Apr. 7, 2010  (GB) .................... 1005764.4

(51) Int. Cl.
*G06F 7/523*  (2006.01)
*G06F 7/53*   (2006.01)

(52) U.S. Cl.
CPC ............... *G06F 7/523* (2013.01); *G06F 7/53* (2013.01)

(58) Field of Classification Search
None
See application file for complete search history.

(56) References Cited

U.S. PATENT DOCUMENTS

| 5,226,001 A | 7/1993 | Garverick |
| 5,446,374 A * | 8/1995 | Pradel .................. G01R 21/133 |
| | | 324/141 |
| 2001/0041548 A1* | 11/2001 | Bult ........................ H03F 3/195 |
| | | 455/252.1 |
| 2004/0037377 A1* | 2/2004 | Brobston ............ H04L 27/3809 |
| | | 375/345 |
| 2007/0239811 A1 | 10/2007 | Bredehoft |
| 2008/0014895 A1 | 1/2008 | Li et al. |

FOREIGN PATENT DOCUMENTS

| EP | 0379296 A2 | 7/1990 |
| WO | 2011124649 A1 | 10/2011 |

* cited by examiner

*Primary Examiner* — Michael D Yaary (57) ABSTRACT

A circuit for multiplying a digital signal by a variable gain, controlled in dependence on a digital gain control value. The circuit comprises: a multiplier input for receiving the digital signal; a multiplier output for outputting the digital signal multiplied by the gain; a plurality of multiplier stages each arranged to multiply by a respective predetermined multiplication factor; and switching circuitry arranged so as to apply selected ones of the multiplier stages in a multiplication path between the input and output, in dependence on the digital gain control value. The multiplication factors are arranged such that binary steps in the digital gain control value result in logarithmic steps in said gain.

22 Claims, 4 Drawing Sheets

LOGARITHMIC GAIN ADJUSTER

CROSS-REFERENCE TO RELATED APPLICATION

This application is the National Stage of, and therefore claims the benefit of, International Application No. PCT/EP2011/055440 filed on Apr. 7, 2011, entitled "LOGARITHMIC GAIN ADJUSTER," which was published in English under International Publication Number WO 2011/124649 on Oct. 13, 2011, and has a priority date of Apr. 7, 2010, based on GB application 1005764.4. Both of the above applications are commonly assigned with this National Stage application and are incorporated herein by reference in their entirety.

FIELD OF THE INVENTION

The present invention relates to a circuit for varying the gain of a digital multiplier.

BACKGROUND

Digital gain adjusters where the gain is set in decibels (dB) are usually built using a digital multiplier and a lookup table to calculate the correct coefficient to apply.

Figure 1:
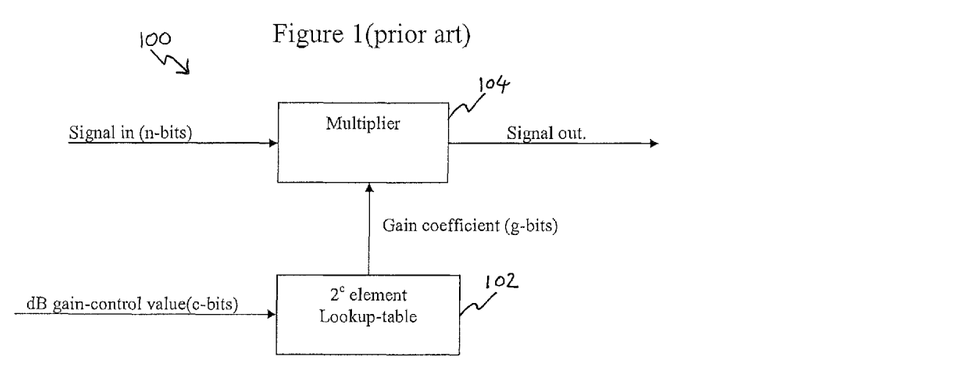
FIG. 1 is a schematic diagram of a digital multiplier.

FIG. 1 illustrates a gain adjuster 100 of this type. The gain adjuster 100 comprises a linear digital multiplier 104 and a lookup table 102. The digital multiplier 104 has an input arranged to receive an n-bit digital signal, and output arranged to output the digital signal multiplied by the gain. The digital multiplier 104 also has a control input coupled to an output of the lookup table 102, for receiving a g-bit gain coefficient. The lookup table 102 receives a c-bit gain-control value representing a gain in decibels (dB). That is, each binary step of the c-bit gain control value (from one binary value to the next) represents a logarithmic step in dB. The lookup table 102 then comprises $2^c$ elements for mapping the c-bit value to a g-bit coefficient representing a gain on a linear scale, for supply to the control input of the linear multiplier 104.

SUMMARY

Instead of using a linear multiplier and a log-linear lookup table for converting a logarithmic control value to a linear gain coefficient, it would be preferable to provide an intrinsically logarithmic multiplier.

According to one aspect of the present invention, there is provided a circuit for multiplying a digital signal by a variable gain controlled in dependence on a digital gain control value, comprising: a multiplier input for receiving the digital signal; a multiplier output for outputting the digital signal multiplied by the gain; a plurality of multiplier stages each arranged to multiply by a respective predetermined multiplication factor; and switching circuitry arranged so as to apply selected ones of said multiplier stages in a multiplication path between said input and said output, in dependence on the digital gain control value; wherein said multiplication factors are arranged such that binary steps in the digital gain control value result in logarithmic steps in said gain.

The present invention thus avoids the need for a lookup table or a general purpose multiplier, by instead using a cascade of switchable digital gain stages, each being arranged to multiply by a predetermined factor.

Another advantage that can be achieved using a logarithmic multiplier is that two or more gain adjustments can be added to produce the overall gain control value. Therefore in a preferred embodiment of the present invention, the circuit may comprise a digital adder arranged to generate the digital gain control value by summing two constituent gain values each representing a gain on a logarithmic scale.

In a particularly advantageous application of the present invention, the circuit is connected along a link for transferring the digital signal between a processor and a radio-frequency circuit.

The constituent gain values may comprise an IQ mismatch gain adjustment and a fine gain adjustment.

The digital signal may be a digital baseband signal, and the circuit may further comprise: a baseband processor coupled to the multiplier input, arranged to execute signal processing software to generate the digital baseband signal; and a wireless transmitter coupled to the multiplier output, having an antenna, radio-frequency circuitry, a mixer, and a digital-to-analogue converter, arranged to generate a radio-frequency signal from said digital baseband signal for wireless transmission via the antenna.

The circuit may comprise a noise shaper coupled between the multiplier input and the baseband processor, arranged to perform noise shaping operation on the digital baseband signal before supply to the multiplier input. The noise shaper may comprise a sigma-delta modulator.

The circuit may comprise at least one digital filter coupled between the baseband processor and the multiplier input, arranged to filter the digital baseband signal before supply to the multiplier input.

The circuit may comprise at least one sample rate converter coupled between the baseband processor and the multiplier input, arranged to convert the sample rate of the digital baseband signal before supply to the multiplier input.

At least the radio-frequency circuitry is preferably implemented on a first chip and at least the baseband processor is preferably implemented on a separate second chip.

Furthermore, the mixer, analogue-to-digital converter, multiplication stages and switching circuitry are preferably implemented on the first chip; and the circuit may comprises a one-bit wide serial link arranged to transfer the digital baseband signal from the first chip to the second chip.

The baseband processor may be arranged to generate the digital gain control value. The circuit may comprise a separate control link for transferring the digital control value from the baseband processor to the switching circuitry.

In a preferred embodiment the switching circuitry may comprise a respective switch for each of said multiplier stages, each arranged so as to selectively apply its respective multiplier stage in said multiplication path in dependence on a respective bit of the digital gain control value.

The gain control value may comprise a plurality of bits each having a degree of bit significance, and at least some of the multiplication factors may be arranged to form a sequence with the respective multiplication factor of each stage being substantially equal to $(2^i/F)$ dB, where i is the respective degree of bit significance and F is a constant within the sequence.

At least some of the multiplier stages may each be arranged to multiply by the respective multiplication factor using only two partial products $1+\frac{1}{2}^{N-i}$ on a linear scale, being substantially equal to $(2^i/F)$ dB on a logarithmic scale, with N being a fixed number; and each such multiplier stage may thus require circuitry for performing only one shift and one addition.

The circuit may comprise left-shift circuitry arranged at said input to perform a left shift operation on said digital signal before the multiplication, and to pad with zeros; and right-shift circuitry arranged at said output to perform a corresponding right-shift operation on the digital signal following the multiplication.

The circuit may comprise sign-extend circuitry arranged at said input to sign extend the digital signal before said multiplication.

The multiplier stages may comprise:
a first multiplier stage arranged to multiply by 257/256 (=20 $\log_{10}$ [257/256] dB)
a second multiplier stage arranged to multiply by 129/128 (=20 $\log_{10}$ [129/128] dB)
a third multiplier stage arranged to multiply by 65/64 (=20 $\log_{10}$ [65/64] dB)
a fourth multiplier stage arranged to multiply by 33/32 (=20 $\log_{10}$ [33/32] dB)
a fifth multiplier stage arranged to multiply by 17/16 (=20 $\log_{10}$ [17/16] dB)

The multiplier stages may comprise:
a sixth multiplier stage arranged to multiply by 227/256 (=20 $\log_{10}$ [227/256] dB)

The multiplier stages may comprise:
a seventh multiplier stage arranged to multiply by 201/256 (=20 $\log_{10}$ [201/256] dB)

The switched may be arranged to apply each of the first to fifth and seventh multiplier stages in response to a first logical level of the respective bit, and to apply the sixth multiplier stage in response to a second, complementary logical level of the respective bit.

BRIEF DESCRIPTION OF THE DRAWINGS

For a better understanding of the present invention and to show how it may be put into effect, reference is made by way of example to the accompanying drawings in which.

DETAILED DESCRIPTION OF PREFERRED EMBODIMENTS

Figure 2:
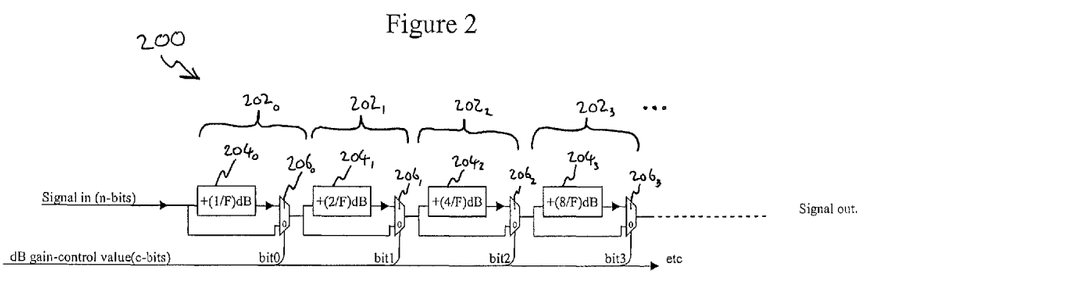
FIG. 2 is a schematic diagram of an alternative digital multiplier.

FIG. 2 illustrates a digital multiplier 200 which avoids the need for a lookup table or a general purpose multiplier. Instead the digital multiplier 200 comprises a cascade of fixed, switchable, digital gain stages 202. Each gain stage 202 comprises a fixed-coefficient multiplier 204.

The digital multiplier 200 has an input arranged to receive an n-bit digital signal, and an output arranged to output the digital signal multiplied by a gain. The gain is set in dependence on a c-bit digital gain-control value, which represents the gain in decibels. That is, each binary step of the c-bit gain control value represents a logarithmic step in dB. By "binary step" is meant the elementary binary counting step from one binary value to the next binary value in the binary counting sequence, i.e. steps between adjacent binary values (e.g. 0001010 to 0001011, etc.). Each such step is in itself of course a linear numerical difference between the two adjacent binary values, but represents a logarithmic step in gain.

In order for the digital multiplier 200 to apply the correct gain based on the gain-control value expressed in dB, the digital multiplier 200 comprises a series of fixed-gain stages $202_0 \ldots 202_{n-1}$ each controlled by a respective bit i=0 ... c−1 of the c-bit gain-control value. Functionally, each gain stage $202_0 \ldots 202_{c-1}$ comprises a respective multiplier $204_0 \ldots c_{-1}$ arranged to multiply by a respective predetermined multiplication factor, and a respective associated switch $206_0 \ldots c_{-1}$. Each switch $206_0 \ldots c_{-1}$ has a control input coupled to a different respective bit i=0 ... c−1 of the gain control value, and is arranged to selectively include the respective multiplier $204_0 \ldots c_{-1}$ in a multiplication path between the input and output of the digital multiplier 200 in dependence on the logical state of the respective bit i=1 ... c−1 (i.e. whether the bit is at a logic-1 or logic-0). The multiplication factors of the different multipliers $204_0 \ldots c_{-1}$ are chosen so as to result in the appropriate logarithmic response to the gain control value expressed in decibels (dB).

The above arrangement means that each multiplier $204_0 \ldots c_{-1}$ corresponds to a different degree of bit significance of the bits i=0 ... c−1. Hence the multiplication factors of the different multipliers $204_0 \ldots c_{-1}$ are preferably chosen to follow the sequence $(2^i/F)$ dB, where F is a constant throughout the sequence. Since a logic-1 at bit position 0 represents one step of (1/F) dB, a logic-1 at bit position 1 represents two steps of (1/F) dB, a logic-1 at bit position 2 represents four steps of (1/F), etc., the result is that each elementary binary step from one binary value to the next causes a fixed step of (1/F) dB in the overall gain which the digital multiplier 200 applies to the digital input signal being multiplied.

Figure 3:
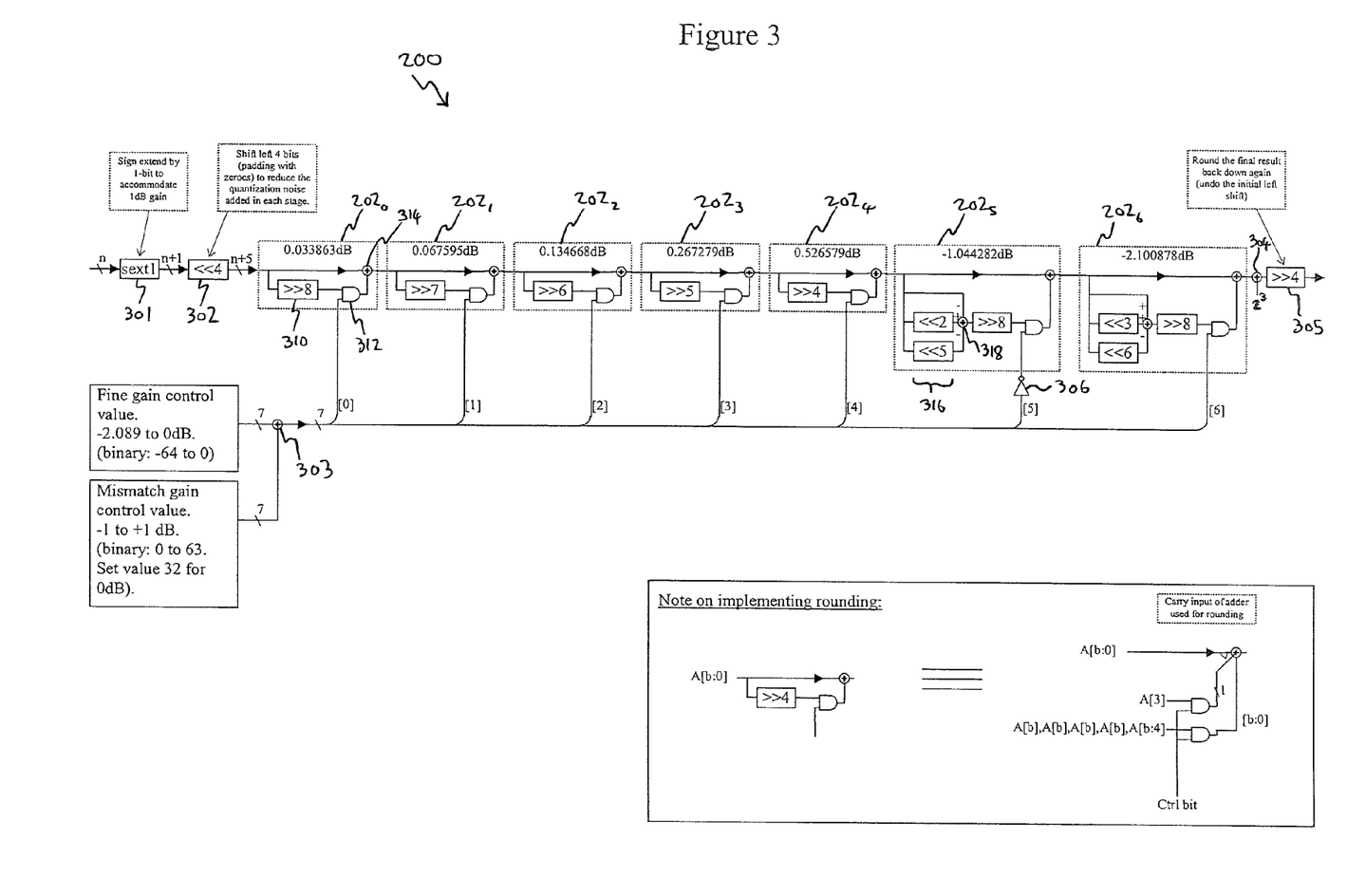
FIG. 3 is a schematic diagram showing an implementation of FIG. 2.

As illustrated in the example of FIG. 3, in order to make this scheme economical, the gain step of (1/F) dB is preferably chosen in order to minimise the complexity of these gain stages 202. This embodiment advantageously provides a practical, low-complexity fine gain adjuster, with two gain control values being used to adjust the actual gain applied. Since both are expressed in dB, their values can be summed to form an aggregate gain control value.

The multiplication factor of each of the first five gain stages $202_0 \ldots 4$ conforms to the sequence $(2^i/F)$ dB. These are the stages controlled by the five least significant (rightmost) bits i=0 ... 4 of the gain-control value.

In a particularly preferred embodiment, these five gain stages $202_0 \ldots 4$ each comprise only a single right shift 310 and a single adder 314, to perform the multiplication by means of only two partial products. In digital logic, shifting a value right by j bits is equivalent to dividing by $2^j$, and shifting a value left by k bits is equivalent to multiplying by $2^k$. Hence a multiplication factor $1+\frac{1}{2^j}$ can be applied by shifting a signal value right by j bits and adding to the un-shifted signal value itself. The second partial product $\frac{1}{2^j}$ is selectively applied by means of an AND gate 312 in each stage $202_0 \ldots c_{-1}$, with one input connected to the respective bit i=0 ... c−1 and the other input connected to the output of the right-shift 310. The output of the AND 312 is connected to an input of the adder 314, with the other input of the adder 314 being connected to receive the signal itself (effectively the first partial product of 1× the signal). Hence the AND gate 314 in each stage $202_0 \ldots c_{-1}$ allows the multiplication factor of either 1 or $1+\frac{1}{2^j}$ to be selectively applied to the signal at each stage, in dependence on the respective bit i=1 ... c−1 of the gain control value.

Thus each multiplication factor $(2^j/F)$ dB of the five least significant gain stages $202_{0\ldots4}$ is calculated by means of the two partial products $1+\frac{1}{2}^{c+1-i}$, resulting in gain steps of approximately 0.0326 dB as follows.

| Gain stage | linear factor | log factor | (equals) |
|---|---|---|---|
| 0 | 257/256 | $20\log_{10}[257/256]$ dB | 0.033863 dB |
| 1 | 129/128 | $20\log_{10}[129/128]$ dB | 0.067595 dB |
| 2 | 65/64 | $20\log_{10}[65/64]$ dB | 0.134668 dB |
| 3 | 33/32 | $20\log_{10}[33/32]$ dB | 0.267279 dB |
| 4 | 17/16 | $20\log_{10}[17/16]$ dB | 0.526579 dB |

The idea of creating a digital multiplier from a chain of gain stages may not be an apparent choice, since it may immediately appear a less efficient implementation than the more conventional approach of a single multiplier with log lookup tables as illustrated in FIG. 1. However, the described multiplier 200 is efficient because of careful choice of the gain steps in order to keep the stages with as low complexity as possible. It is still more efficient when two gain setting inputs are needed (e.g. see below)—normally this would necessitate two multipliers of the type shown in FIG. 1, each with its own log-lookup table, which would be less efficient (more complex).

It is not analytically true that $(2^i/F)$ dB$=1+\frac{1}{2}^{c+1-i}$, but this is an approximation that works well for small gain steps (results in low complexity with small error). At large gain steps (as i approaches c) the approximation would become too inaccurate and require more complex stages.

Consider the gains of stages i and i+1. Ideally, stage i+1 has precisely 2 times the gain in dB of stage i. Thus, ideally:

GainOfStage(i+1)−2*GainOfStage(i)=0.

In practice, using the approximation:

$10*\log(1+\frac{1}{2}^{c-i})-2*10*\log(1+\frac{1}{2}^{c+1-i})=a\_gain\_error$, this simplifies to:

$10*\log(1+1/(2^{c+2-i}(2^{c-i}+1)))=a\_gain\_error$.

This gain error is negligible as long as 'c−i' is high enough.

The multiplier 200 of FIG. 3 may further comprise some additional features. As mentioned, one advantage of using logarithmic gain values is that the overall gain-control value can be produced by adding two (or more) constituent gain values (rather than requiring a further multiplier which would increase complexity). Therefore preferably, the multiplier circuit 200 comprises an addition stage 303 arranged to add a first gain value to a second gain value. As discussed in further detail below, in a particularly preferred application the first gain value may take the form of an IQ mismatch gain control value and the second gain control may take the form of a fine gain adjustment.

In a particular implementation, the multiplier circuit 200 is configured such that the fine gain control value can take a range −2.089 dB to 0 dB (represented by binary values −64 to 0), and the mismatch gain control value can take a range of −1 dB to +1 dB (represented by binary values 0 to 63, with binary value 32 representing 0 dB). As the 7-bit signed binary control value varies from −64 to +63 the gain varies monotonically from (approximately) −3 dB to +1 dB, with 0 dB being obtained when the summed gain control value=32. As long as the sum of the two control inputs=32 then the gain is 0 dB. The 0 dB control setting for the two control inputs is chosen so as to give each input its desired range of −2 dB to 0 dB and −1 dB to +1 dB respectively.

The final two gain stages $202_5$ and $202_6$ are arranged with multiplication factors as follows. These are the stages controlled by the most significant (left-most) bit positions i=5, 6 of the gain-control value.

| Gain stage | linear factor | log factor | (equals) |
|---|---|---|---|
| 5 | 227/256 | $20\log_{10}[227/256]$ dB | −1.044282 dB |
| 6 | 201/256 | $20\log_{10}[201/256]$ dB | −2.100878 dB |

Each of the stages $202_{i=0\ldots c-i}$ should represent a binary weighted multiple of the gain step accurately. This is less complex for small gain steps (stages i=0 to 4 are lower complexity). However, the larger gain steps of −1 and −2 dB need to be more complicated to remain sufficiently accurate since they represent a much larger multiple of the finest gain step. Consequently, more terms 316 are needed in these two stages, along with additional circuitry 318, 306. Nonetheless, the particular 'recipe' given here still has unusually few terms for the accuracy achieved. The table below represents the gain of each stage in steps (of 0.03263382 dB).

| 0.03263382 dB 1 gain step (derived to minimize error) | | | |
|---|---|---|---|
| | stage gain in steps | | |
| Stage | wanted gain | actual gain | gain error |
| 6 | −64 | −64.37733052 | −0.377 |
| 5 | −32 | −31.99999851 | 0.000 |
| 4 | 16 | 16.13598375 | 0.136 |
| 3 | 8 | 8.190252891 | 0.190 |
| 2 | 4 | 4.126628661 | 0.127 |
| 1 | 2 | 2.071311753 | 0.071 |
| 0 | 1 | 1.037670776 | 0.038 |

In further embodiments, the multiplier circuit 200 comprises a 4-bit left-shift 302 applied at the input before multiplication of the signal, with the four right-most empty bit-positions being padded with zeros. This increases the width of the n-bit signal by 4 bits. The multiplier circuit 200 then comprises a corresponding 4-bit right-shift 205 at the output following the multiplication, with the right-most bits being discarded. This undoes the initial lefty shift, so as to reduce the width back by four bits. The overall effect is to reduce the quantisation noise created by the gain stages 202, by allowing a higher resolution signal during those stages 202.

In yet further embodiments, the multiplier circuit 200 comprises a sign extend 301 applied at the input before multiplication of the signal. In digital logic, the convention is that a logic-0 in most-significant bit position indicates a positive number and a logic-1 in the most-significant bit position indicates a negative number. A sign extend operation pads the most significant bit with an extra 0 in the case of a positive number and an extra 1 in the case of a negative number. This increases the width of the signal by 1 bit. In the multiplier circuit 200, this accommodates for the possible 1 dB gain.

A final adder 304 is included at the output of the multiplier 200, for rounding the output (by adding $2^3$) before shifting right by 4 bits.

A rounding that may be applied in a preferred implementation is illustrated in the inset shown in FIG. 3. The inset example of a right-shift by 4 bits represents division by 16.

However, for improved accuracy, it is preferable also to round the result by adding 0.5. This is equivalent to adding bit A[3] of the undivided number A[b:0] to the least-significant bit of the result. This is equivalent to adding 8 before shifting right 4 places to divide by 16. The carry input of the adder 314 is very convenient for this.

If the circuit needs to operate at very high speeds then pipeline stages (not shown) can be added in between the gain stages $202_{i,i+1}$. These pipeline stages may be formed of clocked registers (flip-flops) between every stage or group of stages (depending on the throughput desired vs the speed of the logic).

Figure 5:
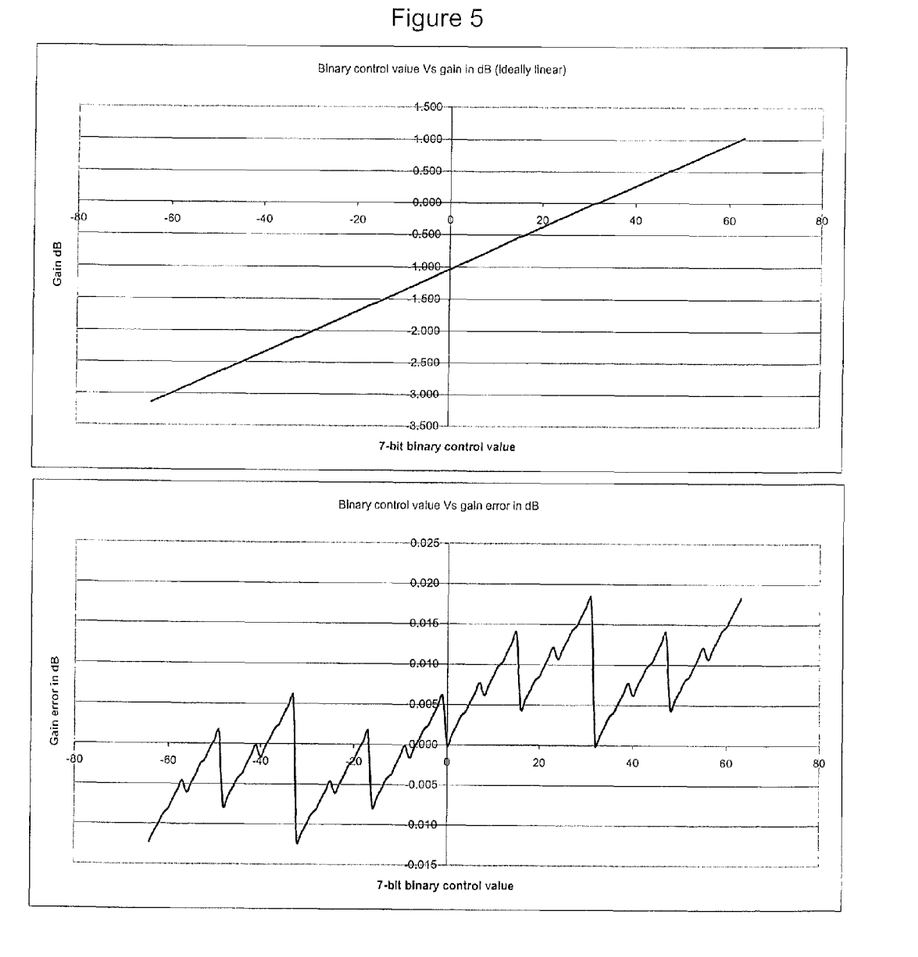
FIG. 5 is a graph of gain and gain error in dB against a gain control value.

The overall 7-stage multiplier circuit 200 of FIG. 3 has the properties:
Range=−3.133 dB to 1.012 dB
Resolution (step size)=0.0326 dB ($<\frac{1}{30}^{th}$ of a dB)
Number of steps: 128
Worst gain error (non linearity)=0.018 dB FIG. 5 is a graph showing the gain and gain error in dB are shown as a function of the 7-bit binary gain control value.

Figure 4:
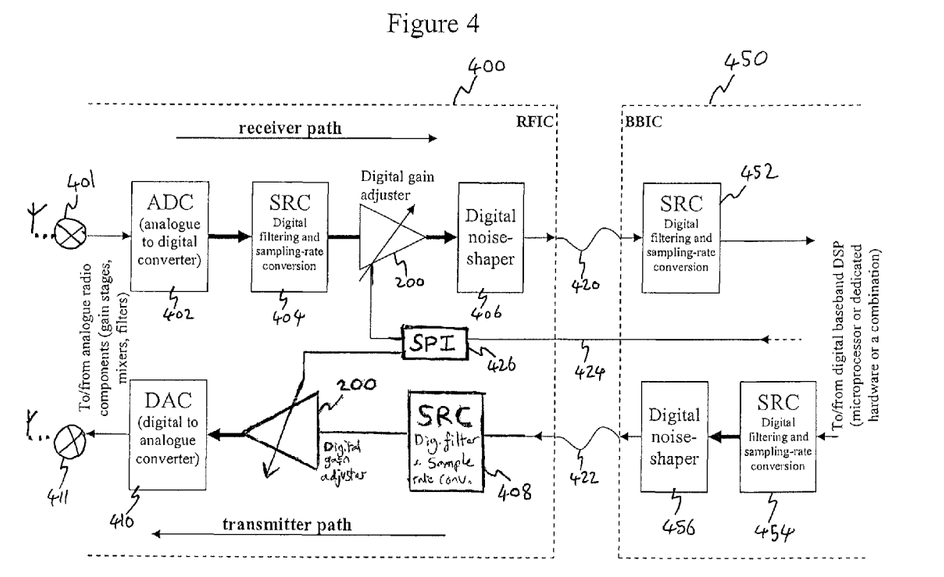
FIG. 4 is a schematic diagram of a processor and RF circuit.

A particularly advantageous application of the present invention is illustrated in FIG. 4.

The system comprises a radio-frequency (RF) integrated circuit (IC), or "chip", 400; and a separate baseband processor chip 450. The RFIC 400 comprises a transmit path for transmitting wirelessly on an uplink to a cellular base station (node B in 3GPP terminology), and a receive path for receiving wirelessly on a downlink from a cellular base station. The transmit path of the RFIC 400 is connected to the baseband processor chip 450 by a 1-bit wide wired serial link 422, and the receive path of the RFIC 400 is connected to the baseband processor chip 450 by another 1-bit wide wired serial link 420. A control link 424 is also provided from the baseband processor chip 450 to a control interface 426 on the RFIC 400, e.g. a Serial Peripheral Interface (SPI).

The baseband processor chip 450 comprises a digital signal processor (DSP, not shown) arranged to execute signal processing code and thereby generate a digital baseband signal representing voice, video or other digital data for transmission on the uplink over a wireless cellular network. The baseband processor chip 450 may also comprise a digital filter 454 and a noise shaper 456. The digital filter 454 is arranged to receive the digital baseband signal from the DSP and thereby digitally filter the baseband signal. The digital filter 454 may also be arranged to perform a sample rate conversion on the digital baseband signal. The output of the digital filter 454 is coupled to an input of the noise shaper 456, which is arranged to perform a noise shaping operation on the digital baseband signal—i.e. to modify the noise spectrum so as to decrease a noise effect in some frequency bands at the expense of increasing noise in other frequency bands. The noise shaper 456 may comprise a sigma-delta module. The noise shaper 456 is further arranged to supply the baseband signal (after filtering and noise shaping) to the transmit path of the RFIC 400 over the serial link 422.

The transmit path on the RFIC 400 comprises a digital filter 408, having its input arranged to receive the digital baseband signal over the serial link 422 from the baseband processor 450. The digital filter 408 is arranged to perform a further filtering and sample rate conversion on the digital baseband signal. The transmit path on the RFIC 400 further comprises a digital gain adjuster in the form of a digital multiplier 200 of the kind described above, as well as a digital-to-analogue converter (DAC) 410, an up-conversion mixer 411, and RF circuitry such as a power amplifier (not shown) for wirelessly transmitting RF signals via an antenna. The digital gain adjuster 200 has an input coupled to the output of the digital filter 408, and is arranged to multiply the digital baseband signal by a factor determined based on the gain control value as discussed. The output of the digital multiplier 200 is coupled to the input of the DAC which converts to an analogue baseband signal for onward supply to the up-conversion mixer 410, which mixes the baseband signal up to radio frequency and thereby generates an analogue RF signal for wireless transmission on the uplink of the wireless cellular network via the RF circuitry and antenna.

On the uplink (transmit path) there are multiple mechanisms requiring accurate gain adjustment. Hence the benefit of the multiplier circuit 200 whereby two gain adjustment inputs can be summed. The two reasons for uplink gain adjustment are IQ mismatch compensation and overall gain setting. IQ mismatch occurs because the analogue mixer stages 411 after the DAC 410 that mix the I and Q signals up to RF are not perfectly gain matched and the local RF oscillator signals driving the I and Q mixers are not in perfect phase quadrature. In addition to the IQ mismatch gain, the fine gain adjustment is applied in order to accommodate for the fact that the analogue gain setting stages applied by the power amplifier (not shown) tend to be quite coarse (e.g. ~3 dB resolution).

On the receive (downlink) path, the RFIC 400 comprises RF circuitry such as a low-noise amplifier (not shown) and a down-conversion mixer 401 connected to receive an RF signal wirelessly via an antenna, and to mix the RF signal down to baseband in order to generate a baseband signal. The receive path of the RFIC 400 further comprises an analogue to digital converter (ADC) 402 arranged to convert the baseband signal to a digital baseband signal, and a digital filter 404 coupled to the output of the ADC 402 in order to filter the digital baseband signal. The digital filter 404 may also involve a sample rate conversion. Next in the receive chain on the RFIC 400 is placed a digital multiplier 200', which may be of the kind described in relation to FIG. 2, with its input coupled to the output of the digital filter 404 so as to multiply the digital baseband signal by a gain set by the gain-control value. The output of the multiplier 200 is then coupled to the input of a digital noise shaper 406 which is arranged to perform a noise shaping operation on the digital baseband signal following said multiplication—i.e. to modify the noise spectrum so as to decrease a noise effect in some frequency bands at the expense of increasing noise in other frequency bands. The noise shaper 406 may comprise a sigma-delta module.

The output of the noise shaper is output over a wired link 420 from the RFIC 400 to the baseband processor chip 450. The wired link is preferably a 1-bit wide serial link so as to reduce the need for complex protocol and avoid unwanted shaped noise that would otherwise be caused such protocol. Once received on the baseband processor chip 450, the baseband signal may be passed through another digital filter and sample rate converter 452, and then input to the processor itself which executes soft-modem software in order to perform signal processing operations on the received baseband signal, such as demodulation, equalization, rake processing, decoding, etc.

By providing the digital multiplier 200' in the position shown in the receive path, this allows fine adjustments to the gain to be made before the baseband signal is passed through the noise shaper 406. This has the advantageous effect of adjusting the gain to make best use of the signal-to-quantisation limit over the link 420.

The digital multiplier 200 and/or 200' on the RFIC 400 may be connected by a control link 424 to a control interface 426 of the processor on the baseband chip 450, by which the processor is enabled to supply the gain-control value for controlling the gain. With regard to the transmit (uplink) path, the DSP may supply the mismatch gain value and fine gain adjustment values separately for addition at the adder 303, or the addition could be performed in software. The gain control value may thus be adjusted by software running on the processor 450 so as to minimise quantisation noise.

It will be appreciated that the above embodiments have been described only by way of example. For instance, a different distribution of the different components between the RFIC 400 and baseband processor chip 450 are possible, e.g. with the digital gain adjuster 200 being implemented on the processor chip 450; and/or in other systems the transmit and/or receive path may comprise a different chain of components. Further, different multiplication factors could be chosen for the gain stages 202 in order to achieve a different logarithmic response (particularly if chosen to provide a low-complexity implementation), and/or different designs of switching circuitry could used. The invention could be used on a transmit path and/or receive path, or indeed in other applications where a digital multiplication is required, and particularly where it is desirable to combine two logarithmic gain values. Other applications or configurations of the present invention may be apparent to a person skilled in the art given the disclosure herein. The invention is not limited by the described embodiments, but only by the appendant claims.

The invention claimed is:

1. A circuit for multiplying a digital signal by a variable gain controlled in dependence on a digital gain control value, comprising:
   a multiplier input for receiving the digital signal;
   a multiplier output for outputting the digital signal multiplied by the gain;
   a plurality of multiplier stages each arranged to multiply the digital signal by a respective predetermined multiplication factor; and
   switching circuitry arranged so as to apply selected ones of said multiplier stages in a multiplication path between said input and said output, in dependence on the digital gain control value;
   wherein said multiplication factors are arranged such that binary steps in the digital gain control value result in logarithmic steps in said gain.

2. The circuit of claim 1, comprising a digital adder arranged to generate the digital gain control value by summing two constituent gain values each representing a gain on a logarithmic scale.

3. The circuit of claim 1, connected along a link for transferring the digital signal between a processor and a radio-frequency circuit.

4. The circuit of claim 2, wherein the constituent gain values comprise an IQ mismatch gain adjustment and a fine gain adjustment.

5. The circuit of claim 1, wherein the digital signal is a digital baseband signal, and the circuit further comprises:
   a baseband processor coupled to the multiplier input, arranged to execute signal processing software to generate the digital baseband signal; and
   a wireless transmitter coupled to the multiplier output, having an antenna, radio-frequency circuitry, a mixer, and a digital-to-analogue converter, arranged to generate a radio-frequency signal from said digital baseband signal for wireless transmission via the antenna.

6. The circuit of claim 5, comprising a noise shaper coupled between the multiplier input and the baseband processor, arranged to perform noise shaping operation on the digital baseband signal before supply to the multiplier input.

7. The circuit of claim 6, wherein the noise shaper comprises a sigma-delta modulator.

8. The circuit of claim 5, comprising at least one digital filter coupled between the baseband processor and the multiplier input, arranged to filter the digital baseband signal before supply to the multiplier input.

9. The circuit of claim 5, comprising at least one sample rate converter coupled between the baseband processor and the multiplier input, arranged to convert the sample rate of the digital baseband signal before supply to the multiplier input.

10. The circuit of claim 5, wherein at least the radio-frequency circuitry is implemented on a first chip and at least the baseband processor is implemented on a separate second chip.

11. The circuit of claim 10, wherein the mixer, analogue-to-digital converter, multiplication stages and switching circuitry are implemented on the first chip; and the circuit comprises a one-bit wide serial link arranged to transfer the digital baseband signal from the first chip to the second chip.

12. The circuit of claim 5, wherein the baseband processor is arranged to generate the digital gain control value.

13. The circuit of claim 11, comprising a separate control link for transferring the digital control value from the baseband processor to the switching circuitry.

14. The circuit of claim 1, wherein the switching circuitry comprises a respective switch for each of said multiplier stages, each arranged so as to selectively apply its respective multiplier stage in said multiplication path in dependence on a respective bit of the digital gain control value.

15. The circuit of claim 14, wherein the gain control value comprises a plurality of bits each having a degree of bit significance, and at least some of the multiplication factors are arranged to form a sequence with the respective multiplication factor of each stage being substantially equal to $(2^i/F)$dB, where i is the respective degree of bit significance and F is a constant within the sequence.

16. The circuit of claim 15, wherein at least some of the multiplier stages are each arranged to multiply by the respective multiplication factor using only two partial products $1+\frac{1}{2}^{N-i}$ on a linear scale, being substantially equal to $(2^i/F)$dB on a logarithmic scale, with N being a fixed number; each such multiplier stage thus requiring circuitry for performing only one shift and one addition.

17. The circuit of claim 1, comprising left-shift circuitry arranged at said input to perform a left shift operation on said digital signal before the multiplication, and to pad with zeros; and right-shift circuitry arranged at said output to perform a corresponding right-shift operation on the digital signal following the multiplication.

18. The circuit of claim 1, comprising sign-extend circuitry arranged at said input to sign extend the digital signal before said multiplication.

19. The circuit of claim 1, wherein the multiplier stages comprise:
   a first multiplier stage arranged to multiply by 257/256 (=20 $\log_{10}$ [257/256] dB)
   a second multiplier stage arranged to multiply by 129/128 (=20 $\log_{10}$ [129/128] dB)
   a third multiplier stage arranged to multiply by 65/64 (=20 $\log_{10}$ [65/64] dB)

a fourth multiplier stage arranged to multiply by 33/32 (=20 log$_{10}$ [33/32] dB)

a fifth multiplier stage arranged to multiply by 17/16 (=20 log$_{10}$ [17/16] dB).

20. The circuit of claim 19, wherein the multiplier stages comprise:

a sixth multiplier stage arranged to multiply by 227/256 (=20 log$_{10}$ [227/256] dB).

21. The circuit of claim 20, wherein the multiplier stages comprise:

a seventh multiplier stage arranged to multiply by 201/256(=20 log$_{10}$ [201/256] dB).

22. The circuit of claim 14, wherein the switches are arranged to apply each of the first to fifth and seventh multiplier stages in response to a first logical level of the respective bit, and to apply the sixth multiplier stage in response to a second, complementary logical level of the respective bit.

* * * * *